(No Model.)

E. M. KNIGHT.
FILTERING MEDIUM AND METHOD OF MAKING SAME.

No. 596,518. Patented Jan. 4, 1898.

WITNESSES
C. W. Fowler
L. B. Buzzy

INVENTOR
Edward M. Knight
by T. Walter Fowler
his Attorney

UNITED STATES PATENT OFFICE.

EDWARD M. KNIGHT, OF BROOKLYN, NEW YORK.

FILTERING MEDIUM AND METHOD OF MAKING SAME.

SPECIFICATION forming part of Letters Patent No. 596,518, dated January 4, 1898.

Application filed May 3, 1897. Serial No. 634,902. (No specimens.)

*To all whom it may concern:*

Be it known that I, EDWARD M. KNIGHT, a citizen of the United States, residing at Brooklyn, in the county of Kings and State of New York, have invented certain new and useful Improvements in Filtering Mediums and Methods of Making the Same, of which the following is a specification, reference being had therein to the accompanying drawings.

My invention relates to the filtering felts, disks, or diaphragms of filters generally, and particularly to such felts, disks, and diaphragms which are composed largely of comminuted asbestos, an indestructible inorganic substance which I have found specially adapted for the filtration of water; and my invention consists of the improved filtering medium and the process of making the same which I shall hereinafter describe and claim.

The objects of my invention are to improve the construction and increase the efficiency of filters of the type employing a fibrous material as a filtering medium, to strengthen the structure of the filtering medium, to cheapen its cost of production, and to automatically sustain its porosity and thereby increase its filtering capacity without danger of its clogging by sedimentary matter.

In the accompanying drawings I illustrate a method of carrying out my invention, in which—

Figure 1:
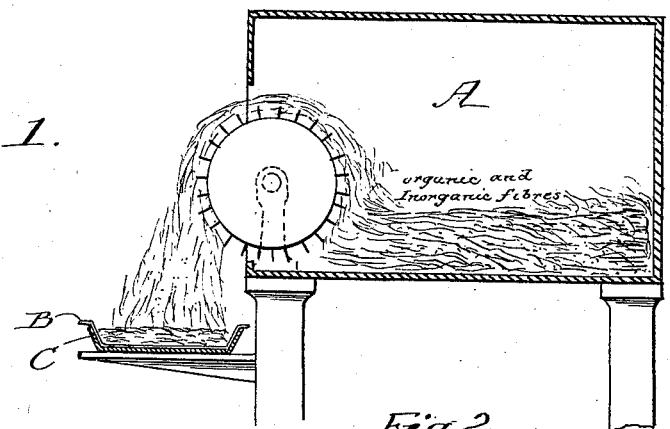
Figure 2:
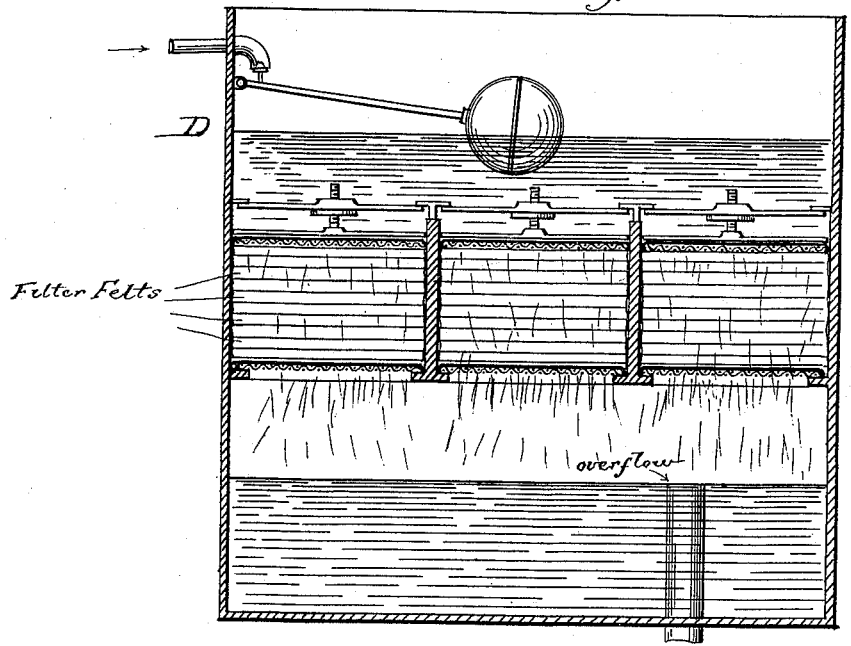
Figure 3:
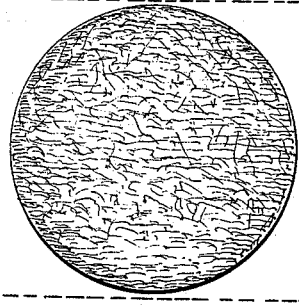

Figure 1 represents the mixture of the inorganic and organic materials which form the improved asbestos felt or filtering medium. Fig. 2 illustrates a series of the felts, disks, or diaphragms under pressure and subjected to a bath to effect a preliminary purification and to increase their porosity. Fig. 3 illustrates a disk or diaphragm ready for use.

In carrying out this invention I prefer to use comminuted asbestos as a felt or filtering medium, as the same has been found especially valuable in arresting the impurities contained in water. Such filtering medium is also cheap to manufacture, is readily removable, and may be thoroughly sterilized by heat without danger of its being destroyed.

In Letters Patent No. 494,426, dated March 28, 1893, I have described and claimed a thin wafer-like film composed of asbestos and subsequently subjected to the action of heat, and in Patent No. 557,399, dated March 31, 1896, I illustrate and describe another and much thicker filtering felt or medium composed of the same material and subjected to pressure and heat. Extensive experiment has shown the wafer-like films of the first-named patent as being so fragile that they are liable to be broken or damaged by handling, so as to permit of the passage through them of unfiltered water. They are also difficult to make of uniform thickness—an important feature. Therefore many of them appear, when held up to the light, uneven in thickness and extremely thin in places. In the form of filtering disclosed in the other patent, No. 557,399, dated March 31, 1896, many of the objections urged against the prior films were overcome, and the improved filtering-felt was very effective in extracting the finest micro-organisms and holding them on its surface. This latter filtering-felt was also open to certain objections, as it was too thick and expensive and was liable to close up so quickly and effectively as to destroy the value of the filtering-felt for rapid-filtering purposes. It was also objectionable because of the disagreeable taste it imparted to the water.

The present improved filtering felt, disk, or diaphragm is without the objections urged against the former patented forms, and the improved results are fourfold, namely: It will not readily close its pores or interstices to the rapid passage of the water, it will cost less to manufacture, it will be tasteless, and it will sustain its own porosity automatically.

In carrying out the present process I take asbestos fibers (inorganic) and like fibers of an organic material and intermingle them by hand (or by the aid of any well-known machine used for a similar purpose in the commingling of cotton and woolen fibers, silk and cotton fibers, &c.) and pass them through a carding-machine A of any well-known type. For the organic fibers I preferably use cotton, because of its cheapness and the ease with which it may be manipulated, and also because of the increased tensile strength it gives the completed felt, disk, or diaphragm. Thus the mass of material in the receptacle will consist of asbestos, a purely inorganic indestructible material, and a certain proportion of organic destructible material. Those familiar with asbestos will readily understand its peculiar characteristics. When wet, it rapidly forms a sort of slime, even when it is woven, and when it is in the loose flake form described this property is made more apparent, and the felt, disk, or diaphragm will soon close its interstices or pores and become impenetrable even to water, and the thicker the felt the more rapid this objectionable feature. This property is largely destroyed by the addition to the mass of asbestos fibers of the fibers of an organic destructible material, as before mentioned. When the filtering felt, disk, or diaphragm is completed and is composed of this mixture of inorganic and organic material, it does not appear to the eye to be radically different from the felt of my said former patent, No. 557,399, but the difference between the two forms will be quickly discovered by the rapidity with which the improved felt filters the water and the length of time it retains its speed. This is due to the fact that the former felt being composed entirely of asbestos there was nothing to break or interrupt the thick slimy surface or bed, and it necessarily soon clogged up with the impurities taken from the water; but when there has been added to the asbestos the organic fibers the constant passage of water through the felt, disk, or diaphragm has been found to dissolve enough of the organic structure to maintain the porosity of the felt, disk, or diaphragm by opening up interstices or passages through the asbestos portion. These interstices or passages of course are not direct channels, but are of any irregular character due to the irregular disposition of the fibers, and they are such that any water passing through them will be filtered of its sedimentary impurities and micro-organisms.

In order that a portion of the organic structure may be preliminarily removed and to take from the asbestos the objectionable taste which it gives to the water, I remove the mass of combined asbestos and organic fibers from the receptacle, after first using the sheets of muslin B, as described in my said former patent, No. 557,399, and place it, with others of a like character and produced by the same method, in a suitable vessel D and clamp them together and cause water to pass through them. I prefer to use hot water, as this will more quickly dissolve the magnesia contained in the asbestos, which gives it its bad taste, and also dissolve a certain percentage of the organic fibers, thereby rendering the filtering felt, disk, or diaphragm more porous. When the water has acted on the material for a sufficient length of time to remove the taste of the magnesia, I remove the felts, disks, or diaphragms and place them in an oven and subject them to heat to evaporate the moisture and at the same time destroy some of the remaining organic material or fibers (it being understood that the asbestos, being indestructible by heat, is not affected by this operation) and thereby further increase the porosity of the felt. When the felts, disks, or diaphragms are removed from the oven, they are ready for use, and they will be found to have the following improved properties, namely: They will be free from taste, they will be much more porous than the previously-patented ones, and they may be handled without danger of injuring them, as they now have a kind of tough leathery appearance to both sight and touch. The filtering felt, disk, or diaphragm will also possess certain new properties, namely: It will have innate porosity, and it will automatically sustain that porosity. The first characteristic is due to the presence of the organic fibers, which give to the mass of asbestos a certain porosity that it had not before, and the second property is effected automatically by the action of the water passing through the felt, disk, or diaphragm, dissolving and destroying portions of the organic fibers that still remained after the preliminary washing and heating of the felt. As a matter of fact, the amount of organic fibrous material left mixed with the asbestos is so small in comparison to the bulk of the asbestos and the proportion dissolved even by a large volume of water is so minute that not a trace appears in the filtered water, as analysis shows. The porosity of the felt is sustained by the combined action of the asbestos and organic fibers rather than by the action of the water alone, because the water passing through the felt is relieved of its impurities by the asbestos and being thus cleansed has its solvent properties renewed. Thus the effect is due to the action of the asbestos on the water and the action of the purified water on the organic material.

The asbestos fibers being practically bound together by the fibers of the organic material result in increased tensile strength being given to the filtering felt, disk, or diaphragm, making them easy to handle without injury.

The filtering felt, disk, or diaphragm therefore is stronger, cheaper to make, more porous, and altogether superior to that described in the previous patented cases mentioned, so much so that it can be used between perforated disks without any asbestos fibrous covering, a great advantage where various liquids of a different color and nature or character are being filtered, because if cloth is used it becomes impregnated, as well as the filtering medium, and as it cannot be changed this would make it necessary to have a set of cloth-covered disks for each liquid. With my new filtering-diaphragm it does away with the necessity of the cloth and so one filter can be used for wines of a different color and character, spirits, and other liquid by simply changing the diaphragms.

The filtering felts, disks, or diaphragms when ready for use are preferably placed within a filter between upper and lower disks or plates covered with woven material, as disclosed in my said former patents and the application filed of even date herewith.

Having thus described my invention, what

I claim as new, and desire to secure by Letters Patent, is—

1. The method of making filtering felts, disks or diaphragms which consists in intimately combining the fibers of an organic and soluble material with the fibers of an inorganic and substantially insoluble material and then subjecting the combined materials to pressure and heat.

2. The method of making filtering felts, disks or diaphragms which consists in intimately combining with the fibers of a mass of inorganic material, the fibers of an organic and substantially soluble material; then passing a fluid through the combined material whereby the particles of the organic soluble material are dissolved by the action of the fluid upon them and new interstices or pores are opened and the porosity of the felts, disks or diaphragms thereby increased.

3. The method of making filtering felts, disks or diaphragms which consists in mixing with the fibers of a mass of indestructible inorganic material, the fibers of a destructible organic material; then subjecting the combined mass to pressure; then passing water through the mass of combined material and finally applying heat to the mass to evaporate the contained moisture and partially destroy the organic material and thereby open up new interstices or pores in said felts, disks or diaphragms to increase the porosity thereof.

4. An improved filtering felt, disk or diaphragm consisting of the fibers of an indestructible inorganic material and the fibers of a destructible organic material intimately combined therewith, the whole mass being subjected to pressure and purification.

In testimony whereof I affix my signature in presence of two witnesses.

EDWARD M. KNIGHT.

Witnesses:
  CHAS. W. LINK,
  JOS. SIMPSON.